Nov. 19, 1935.  F. W. MARTIN  2,021,315
BOOSTER MOTOR SUPPORT
Filed Sept. 26, 1928
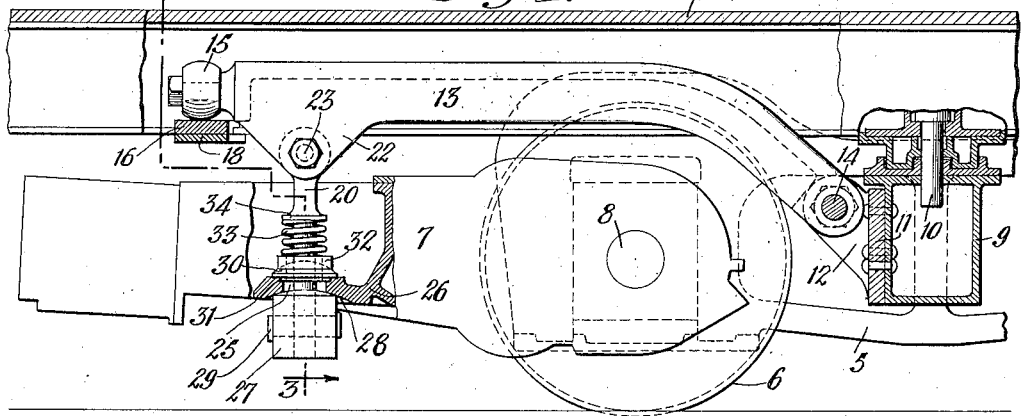
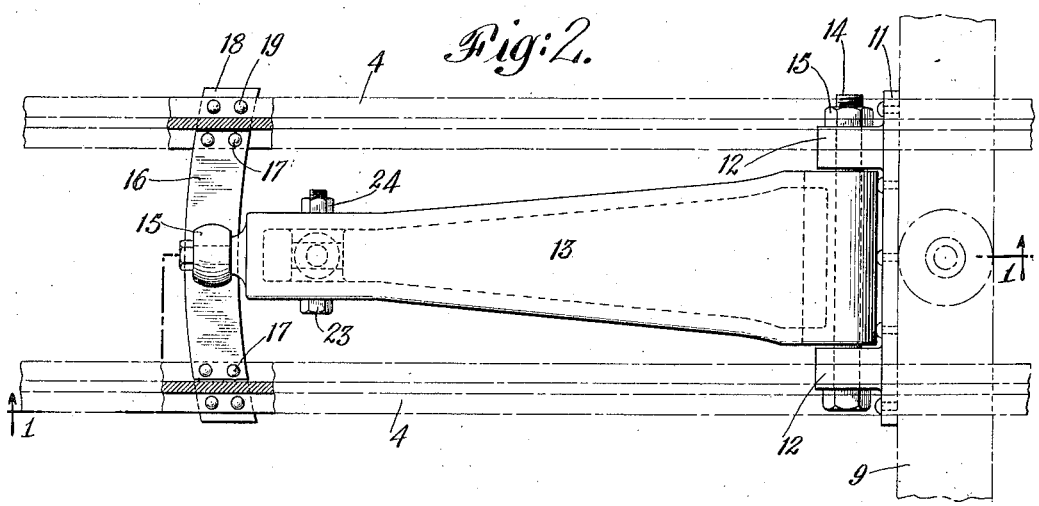
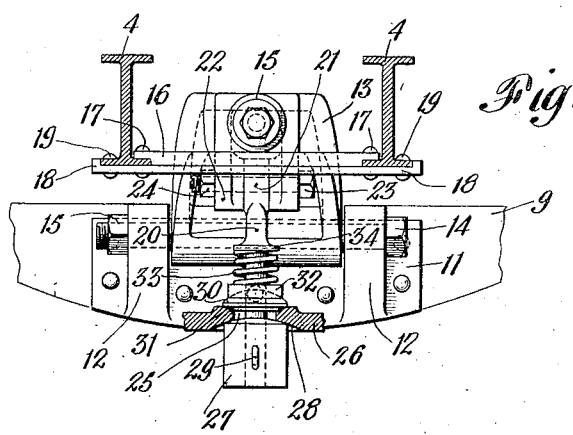
INVENTOR
Frederick W. Martin
BY
Symestvedt & Lechner
ATTORNEYS Patented Nov. 19, 1935

2,021,315

UNITED STATES PATENT OFFICE 2,021,315

BOOSTER MOTOR SUPPORT

Frederick W. Martin, Bronxville, N. Y., assignor to Franklin Railway Supply Company, New York, N. Y., a corporation of Delaware Application September 26, 1928, Serial No. 308,378

9 Claims. (Cl. 105—138)

This invention relates to booster motor supports and particularly to such supports for use with booster motors which are associated with pivoted trucks, especially trucks having four or more wheels, such as tender or locomotive trailer trucks.

The nature, objects and advantages of the invention may be best understood from a consideration of the following description taken with the accompanying drawing, in which—

Fig. 1 is a side view of a portion of a tender frame and truck with a booster motor applied, certain of the parts being shown in vertical section substantially as indicated by the line 1—1 of Fig. 2 and others being shown somewhat diagrammatically.

Fig. 2 is a top view of the supporting structure, some of the parts being omitted and others being shown diagrammatically, all for the sake of clarity, and Fig. 3 is a section taken substantially on the line 3—3 of Fig. 1.

Referring now more particularly to the drawing, the center sills of the tender frame are indicated by the reference character 4, while the character 5 indicates the truck frame as a whole, the truck being of the four wheel type in this case, with only one of the wheels 6 showing in the drawing. A booster motor 7 is operatively associated with the axle 8 on which the wheels 6 are mounted and extends therefrom away from the truck 5 below the sills 4.

The truck frame has the usual bolster 9 which is pivoted to the tender frame by means of the pin 10 in a well known manner.

The supporting mechanism of the present invention includes a bracket member 11 having spaced and apertured lugs 12 secured to the truck bolster 9 at its side towards the axle 8 with which the booster 7 is associated. A supporting lever or arm 13 has an aperture at one end thereof which is adapted to receive the pin 14 which passes through and extends between the spaced lugs 12. A nut 15 serves to secure the pin 14 in position. It should be observed that the arm 13 is configured and arranged to extend from the pin 14 upwardly and over the axle 8 and the associated booster motor 7 and is further of relatively wide and heavy construction, as clearly seen in Figure 2, so as to be substantially rigid at least in a horizontal plane. At its outer end the arm 13 is provided with a roller 15 which rides on the track or bracket 16, the latter being arcuately formed with the pin 10 as a center and secured to the center sills 4 as indicated at 17 in Figs. 2 and 3.

A strengthening member 18 may be provided for the track 16, the same being secured to the sills 4 in any suitable manner as by means of the rivets 19.

The booster motor 7 is supported by the arm 13 by means of the link 20 having an eye 21 at its upper end adapted to be engaged by the pair of apertured lugs 22 which depend from the arm 13 near its outer end. A pin or bolt member 23, together with the nut 24, serves to secure the eye 21 in position between the lugs 22. The lower end of the link 20 projects through an opening 25 in the booster bed plate 26 and is provided with a supporting block 27 having an upper spherical bearing surface adapted to engage a complementary concave bearing surface 28 formed in the bed plate 26 around its opening 25. A pin or key 29 secures the block 27 to the link 20.

Above the bed plate 26 I have provided a semi-spherical member 30 having a circular shoulder on its under side adapted to engage a corresponding recess or shoulder formed in the bed plate 26 around the opening 25, the same being indicated at 31 in Figs. 1 and 3. A bearing cap member 32 is provided with a concave surface on its under side adapted to fit and bear on the spherical surface of the member 30. A spring 33 is arranged around the link 20 and reacts between the member 32 and an annular shoulder 34 formed on the link 20.

The last described parts of the supporting structure serve to retain the booster motor 7 in its normal supported position by yieldingly resisting any tendency of the booster motor to move or jerk upwardly during operation. It should also be observed that the rounded or semi-spherical bearing surfaces above and below the booster bed plate 26 are provided in order to ensure absolute freedom of motion when the track or other conditions cause the booster motor to rock somewhat with respect to the center sills and the supporting arm 13.

The swinging operation of the arm 13, when the locomotive is taking curves, is, of course, obvious. The arm 13 merely pivots with the truck 5 on the pin 10, the roller 15 moving from side to side over its track 16 to support the booster motor as it pivots with the truck. The arm 13, therefore, takes at least a portion of the lateral thrust of the motor, as the truck pivots, and thus relieves strains which would otherwise be imposed on the axle 8 during pivotal action.

I claim:—

1. In combination with a railway vehicle, a pivoted truck adapted to the application of a booster motor, a booster motor supporting member secured at one end to the truck for horizontal movement thereby during its pivotal movement, the said member being restrained as against relative lateral movement with respect to the truck, and for upward and downward swinging movement with respect to the truck, means for supporting the other end of said member, and a booster motor suspended from the member intermediate its ends.

2. In combination with a railway vehicle, a pivoted truck adapted to the application of a booster motor, a booster motor supporting member secured at one end to the truck for horizontal movement thereby during its pivotal movement, the said member being restrained as against relative lateral movement with respect to the truck, and for upward and downward swinging movement with respect to the truck, means for supporting the other end of said member from the vehicle, and a booster motor suspended from said member.

3. In combination with a railway vehicle, a pivoted truck adapted to the application of a booster motor, a booster motor supporting member secured at one end to the truck for horizontal movement thereby during its pivotal movement and for upward and downward swinging movement with respect to the truck, means for supporting the other end of said member, means restraining said member as against relative lateral movement with respect to the truck, a booster motor, and means for suspending the motor from the member including an interconnection rigid substantially transversely of the vehicle.

4. In combination with a railway vehicle, a pivoted truck adapted to the application of a booster motor, a booster motor supporting member secured at one end to the truck for horizontal movement thereby during its pivotal movement, the said member being restrained as against relative lateral movement with respect to the truck, and for upward and downward swinging movement with respect to the truck, means for supporting the other end of said member, a booster motor, and means for suspending the motor from the member including an interconnection pivoted to said member on an axis extending substantially transversely of the vehicle, said interconnection being rigid substantially transversely of the vehicle.

5. In combination with a railway vehicle, a pivoted truck including a bolster and having an axle and a pair of wheels mounted therein, a booster motor associated with said axle, and a supporting mechanism for the motor including a supporting member pivoted at one end to the truck bolster on a horizontally disposed axis, means for supporting the other end of said member from the vehicle with freedom for movement transversely thereof and a transversely rigid suspending connection between the motor and said member arranged to provide some freedom for relative movement of the motor and the member generally fore and aft of the vehicle.

6. In combination with a railway vehicle frame, a pivoted truck frame having an axle and a pair of wheels mounted therein, a booster motor associated with said axle, and a booster motor supporting mechanism including a supporting member mounted at one end on the vehicle frame and at the other end on the truck frame, the mounting for the end first mentioned providing for movement thereof vertically with the vehicle frame and movement thereof transversely with respect to the vehicle frame and the mounting for the other end of said member providing for transverse pivotal movement thereof with the truck frame and for upward and downward swinging movement with respect to the truck frame, together with a device engaging the booster and pivotally secured to said member on an axis extending substantially transversely of the vehicle.

7. In combination with a railway vehicle frame, a pivoted truck frame having an axle and a pair of wheels mounted therein, a booster motor associated with said axle, and a booster motor supporting mechanism including a supporting member mounted at one end on the vehicle frame and at the other end on the truck frame, the mounting for the end first mentioned providing for movement thereof vertically with the vehicle frame and movement thereof transversely with respect to the vehicle frame and the mounting for the other end of said member providing for transverse pivotal movement thereof with the truck frame and for upward and downward swinging movement with respect to the truck frame, the said member being restrained as against relative lateral movement with respect to the truck frame.

8. In combination with a railway vehicle, a pivoted truck adapted to the application of a booster motor, a booster motor supporting member, means for pivotally securing said member to a part of the truck with freedom for relative upward and downward swinging movement, said pivot means being constructed and arranged to restrain relative movement of the truck and supporting member in a general horizontal plane, means for supporting the other end of said member, and a booster motor hung from said member at a point spaced substantially from the pivotal attachment thereof with the truck.

9. In combination with a railway vehicle having spaced main frame members, a pivotal truck frame having an axle and a pair of wheels mounted therein, a booster motor associated with said axle and extended laterally therefrom, and a supporting mechanism for said motor, said mechanism including a supporting member secured at one end to a part of the truck frame and extended therefrom upwardly to a point laterally between the frame members and thence horizontally over the booster motor, mounting means serving to support the other end of said supporting member between said spaced frame members with freedom for movement generally transverse the vehicle between the spaced frame members, and means serving to hang the motor from said member, such means including a connection depending from said member.

FREDERICK W. MARTIN.